(12) United States Patent
Okita et al.

(10) Patent No.: US 12,454,073 B2
(45) Date of Patent: Oct. 28, 2025

(54) METHOD FOR MANUFACTURING LINEAR MEMBER

(71) Applicant: Yugen gaisha OKITA Industrial Technology Development, Nishio (JP)

(72) Inventors: Yoshinari Okita, Nishio (JP); Toyoki Okita, Nishio (JP)

(73) Assignee: Yugen gaisha OKITA Industrial Technology Development, Nishio (JP)

( * ) Notice: Subject to any disclaimer, the term of this patent is extended or adjusted under 35 U.S.C. 154(b) by 18 days.

(21) Appl. No.: 18/276,565

(22) PCT Filed: Dec. 24, 2021

(86) PCT No.: PCT/JP2021/048139
§ 371 (c)(1),
(2) Date: Aug. 9, 2023

(87) PCT Pub. No.: WO2022/190579
PCT Pub. Date: Sep. 15, 2022

(65) Prior Publication Data
US 2024/0308105 A1    Sep. 19, 2024

(30) Foreign Application Priority Data

Sep. 3, 2021   (JP) ................................ 2021-037698

(51) Int. Cl.
*B28B 3/16*        (2006.01)
*C03B 19/06*      (2006.01)
(Continued)

(52) U.S. Cl.
CPC .............. *B28B 3/16* (2013.01); *C03B 19/066* (2013.01); *H01B 1/04* (2013.01); *H01B 13/0036* (2013.01)

(58) Field of Classification Search
CPC ....... B28B 3/16; C01B 32/168; C03B 19/066; H01B 1/02; H01B 1/04; H01B 13/0036;
(Continued)

(56) References Cited

U.S. PATENT DOCUMENTS 7,950,126 B2 * 5/2011 Hammock .......... B21C 37/0818
29/430
2018/0077797 A1 * 3/2018 Braley .................... H01B 1/026

FOREIGN PATENT DOCUMENTS

JP        63-264820 A     11/1988
JP        63-292527 A     11/1988
(Continued)

OTHER PUBLICATIONS

JP 2015/079671A—Machine Translation (Year: 2015).*

*Primary Examiner* — Yunju Kim
(74) *Attorney, Agent, or Firm* — Yoshida & Associates LLC; Kenichiro Yoshida

(57) ABSTRACT

A method for manufacturing a linear member reduces changes in the physical properties of a substance serving as a material for the linear member that may be caused when the substance is formed into a linear shape from powder. A manufacturing device usable for the method for manufacturing a linear member is a device for manufacturing a linear member having a predetermined function. The device includes a compressor. The compressor compresses, from an outer periphery of an elongated hollow body (9), the hollow body (9) accommodating powder of a substance having the predetermined function at an inner periphery of the hollow body (9) to compact the powder to allow the powder to substantially show the predetermined function. The linear member can be freely deformed while linearly accommodating the powder and maintaining the powder compacted. This structure can reduce changes in the physical properties of a substance in the linear member having the predeter-
(Continued)

mined function that may be caused when the substance is formed into a linear shape from the powder.

5 Claims, 16 Drawing Sheets

(51) Int. Cl.
 *H01B 1/04* (2006.01)
 *H01B 13/00* (2006.01)
(58) Field of Classification Search
 CPC .. H01B 5/02; H02K 3/02; Y02E 40/60; Y10S 977/742; Y10S 977/932; B29C 43/46; B29C 2043/461
 See application file for complete search history.

(56) References Cited

FOREIGN PATENT DOCUMENTS

| | | |
|---|---|---|
| JP | 63-298919 A | 12/1988 |
| JP | 64-063225 A | 3/1989 |
| JP | 02-015513 A | 1/1990 |
| JP | 06-023586 A | 2/1994 |
| JP | 2008-108583 A | 5/2008 |
| JP | 2015-079671 A | 4/2015 |

* cited by examiner (IV - IV)

(V — V)

(XIV-XIV)

Enlarged view of portion XV (XXIV-XXIV)

Enlarged view of portion XXV (XXIX-XXIX)

Enlarged view of portion XXX

Enlarged view of portion XXXI

METHOD FOR MANUFACTURING LINEAR MEMBER

FIELD

The present disclosure relates to a method for manufacturing a linear member.

BACKGROUND

Known highly conductive substances include rare earth metals, graphite from carbon, and carbon nanotubes (CNT). These highly conductive substances are to be usable as materials for electric cables.

Such highly conductive substances may be formed into a linear shape appropriate for electric cables with various methods. For example, Patent Literature 1 describes a method for manufacturing a twisted CNT electric cable through dry spinning from a CNT forest.

Powder of highly conductive substances used as materials for the above electric cables may change the physical properties when formed into a linear shape from powder. Such changes in the physical properties may lower conductivity.

In addition to highly conductive substances, insulating substances such as silicon compounds and quartz glass usable as materials for optical fibers may also change the physical properties when formed into a linear shape from powder.

CITATION LIST

Patent Literature

Patent Literature 1: Japanese Unexamined Patent Application Publication No. 2018-133296

BRIEF SUMMARY

Technical Problem

One or more aspects of the present disclosure are directed to a method for manufacturing a linear member and a device for manufacturing a linear member to reduce changes in the physical properties of a substance serving as a material for the linear member that may be caused when the substance is formed into a linear shape from powder.

Solution to Problem

A manufacturing method according to an aspect of the present disclosure is a method for manufacturing a linear member having a predetermined function. The method includes compressing, from an outer periphery of a hollow body being elongated, the hollow body accommodating powder of a substance having the predetermined function at an inner periphery of the hollow body to compact the powder while maintaining the powder linearly accommodated to extend in a longitudinal direction of the hollow body.

In a manufacturing method according to a first aspect of the present disclosure, the powder accommodated at the inner periphery of the hollow body is bound with a sublime substance. The manufacturing method according to the first aspect includes heating the sublime substance accommodated at the inner periphery of the hollow body to sublime to extract gas caused by sublimation out of the hollow body through a pore formed in the hollow body.

In a manufacturing method according to a second aspect of the present disclosure, the compressing the hollow body includes compressing the hollow body to cause a portion of a material for the hollow body to protrude outward. The manufacturing method according to the second aspect further includes bending the portion protruding outward to define a space separate from the inner periphery of the hollow body at the outer periphery of the hollow body.

In a manufacturing method according to a third aspect of the present disclosure, the compressing the hollow body includes compressing the hollow body to cause a portion of a material for the hollow body to protrude outward and forming, at the outer periphery of the hollow body, another hollow body to accommodate the powder using the protruding portion to compact the powder in the other hollow body.

A manufacturing method according to a fourth aspect of the present disclosure further includes twisting a plurality of hollow bodies formed in the compressing the hollow body included in the manufacturing method according to the third aspect.

This method for manufacturing the linear member according to each of the above aspects reduces changes in the physical properties of a substance serving as a material for a linear member that may be caused when the substance is formed into a linear shape from powder.

DETAILED DESCRIPTION

Embodiments according to the present disclosure are described in detail below.

EMBODIMENTS

Structure of First Embodiment

A manufacturing method according to a first embodiment is described with reference to FIGS. 1 to 21.

The manufacturing method according to the first embodiment is a method for manufacturing a linear member 2 having a predetermined function, such as an electric cable. The manufacturing method uses, as a material, powder of a highly conductive substance, such as carbon nanotubes. The manufacturing method according to the first embodiment includes forming, degassing, compression, an additional process, and cooling described below.

A manufacturing method according to the first embodiment is described below with a manufacturing device 1.

Figure 1:
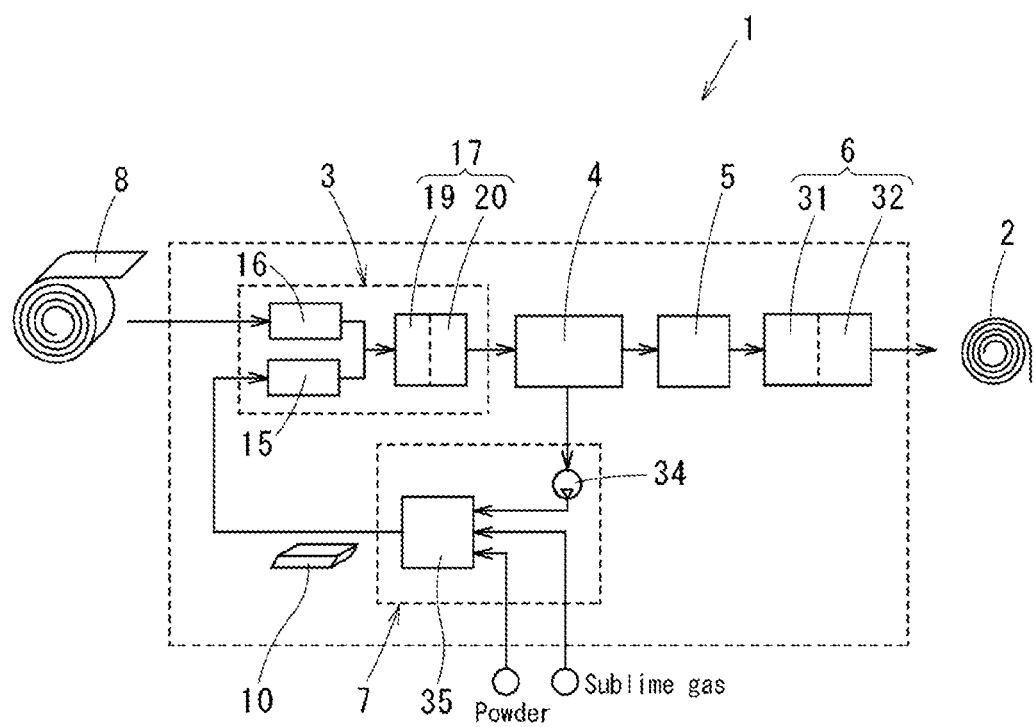
FIG. 1 is a block diagram of a manufacturing device (first embodiment).

The manufacturing device 1 includes a forming unit 3 for forming, a degasser 4 for degassing, a compressor 5 for compression, an adder 6 for an additional process, and a cooler 7 for cooling (refer to, for example, FIG. 1).

The manufacturing device 1 successively receives, as materials of the linear member 2, a plate-like elongated material 8 with a predetermined thickness and the powder. These materials successively pass through the forming unit 3, the degasser 4, the compressor 5, and the adder 6 to be formed into the linear member 2.

Hereafter, the forming unit 3, the degasser 4, the compressor 5, the adder 6, and the cooler 7 are successively described together with forming, degassing, compression, an additional process, and cooling.

The forming unit 3 performs forming in which the forming unit 3 places the powder linearly in the longitudinal direction on the plate-like elongated material 8 with a predetermined thickness and folds the elongated material 8 to wrap the powder with the elongated material 8 to form a hollow body 9. The powder is received on the elongated material 8 and is bound with a sublime substance and accommodated at the inner periphery of the hollow body 9 together with the sublime substance. More specifically, the powder is received on the elongated material 8 in the shape of a pillar 10 preformed together with the sublime substance and accommodated at the inner periphery of the hollow body 9 as the pillar 10. As described later, the pillar 10 is placed in the cooler 7 and fed to the forming unit 3.

Figure 2:
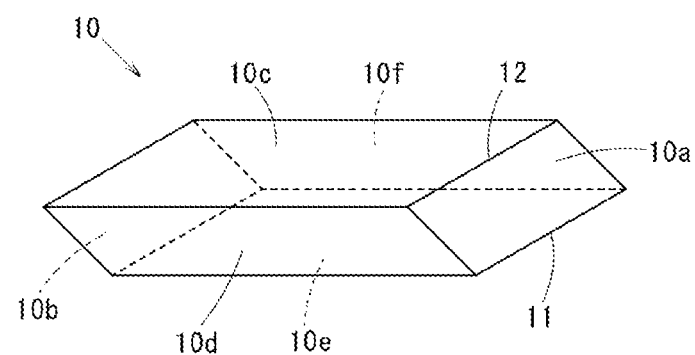
FIG. 2 is a perspective view of a pillar (first embodiment).
Figure 3:
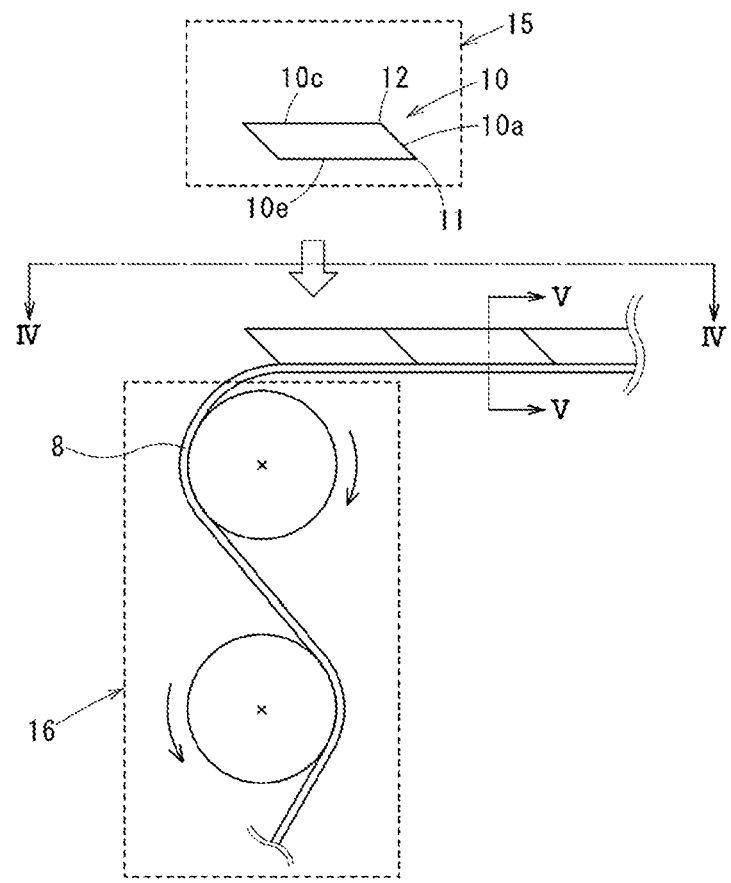
FIG. 3 is a diagram describing first and second feeders in a forming unit (first embodiment).
Figure 4:
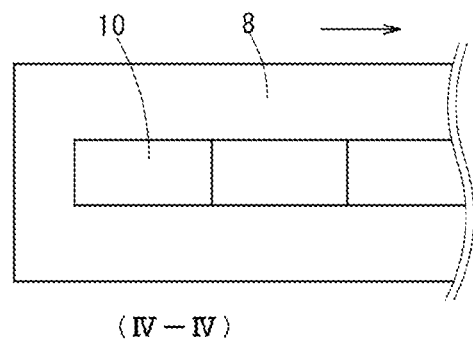
FIG. 4 is a view of the first and second feeders as viewed in the direction indicated by the arrows along line IV-IV in FIG. 3 (first embodiment).
Figure 5:
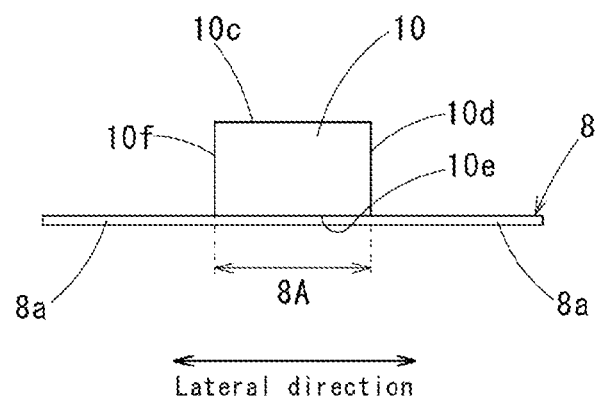
FIG. 5 is cross-sectional view of the first and second feeders taken along line V-V in FIG. 3 (first embodiment).
Figure 6:
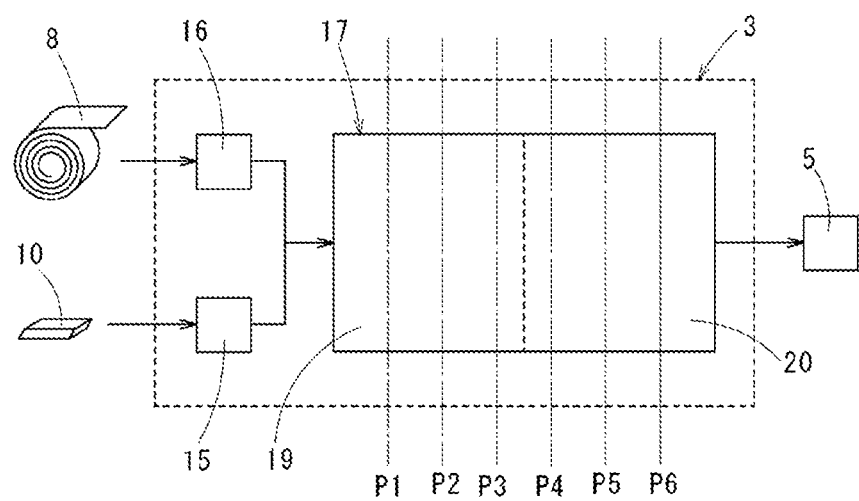
FIG. 6 is a diagram describing a hollow-body forming unit in the forming unit (first embodiment).

The pillar 10 has, for example, the shape below (refer to, for example, FIG. 2).

More specifically, the pillar 10 has the shape of an oblique prism with end faces 10a and 10b at the two ends in the longitudinal direction inclined with respect to the longitudinal direction. The end faces 10a and 10b are rectangles with the same shape and have corresponding four edges parallel to one another. Each of four side surfaces 10c, 10d, 10e, and 10f between the corresponding edges is a parallelogram elongated in the longitudinal direction. The side surfaces 10c and 10e face each other and are parallel to each other. The side surfaces 10d and 10f face each other and are parallel to each other.

The side surfaces 10c and 10e between the long edges of the parallelograms of the end faces 10a and 10b are rectangles elongated in the longitudinal direction. Of the two longer edges of the end faces 10a and 10b, the edge protruding acutely may be hereafter referred to as an acute edge 11, and the edge protruding obtusely may be hereafter referred to as an obtuse edge 12.

The structure of the forming unit 3 is described below.

The forming unit 3 includes first and second feeders 15 and 16 and a hollow-body forming unit 17 (refer to, for example, FIG. 1). The first feeder 15 first feeds the pillar 10, and the second feeder 16 feeds the elongated material 8 (refer to, for example, FIGS. 3 and 4).

The first feeder 15 successively feeds the pillar 10 downward. More specifically, the first feeder 15 feeds the pillar 10 to have the acute edge 11 of the end face 10a located below, the obtuse edge 12 of the end face 10a located above, the side surface 10e located below, and the side surface 10c located above. As described below, the first feeder 15 feeds the pillar 10, with the longitudinal direction of the pillar 10 substantially aligned with the direction in which the second feeder 16 feeds the elongated material 8.

The second feeder 16 successively feeds the elongated material 8 in the longitudinal direction to place the pillar 10 on the upper surface of the fed elongated material 8. As described above, the second feeder 16 feeds the elongated material 8 in the direction substantially aligned with the longitudinal direction of the pillar 10.

The first feeder 15 feeds the pillar 10, and the second feeder 16 feeds the elongated material 8 to cause the end face 10b of the preceding pillar 10 and the end face 10a of the following pillar 10 to abut against each other. In this state, the acute edge 11 of the end face 10a of the following pillar 10 is substantially aligned with the obtuse edge 12 of the end face 10b of the preceding pillar 10, and the obtuse edge 12 of the end face 10a of the following pillar 10 is substantially aligned with the acute edge 11 of the end face 10b of the preceding pillar 10.

For example, the hollow-body forming unit 17 folds the elongated material 8 when forming a longitudinal fold on the elongated material 8 receiving the pillar 10 to form the hollow body 9. The hollow-body forming unit 17 includes, for example, first and second benders 19 and 20 described below (refer to, for example, FIGS. 1 and 6).

The first bender 19 first folds, upward, two outer portions 8a of a range 8A of the elongated material 8 in the lateral direction to align the outer portions 8a along the side surfaces 10d and 10f (refer to, for example, FIGS. 5 and 7 to 9). The range 8A receives the pillar 10. Subsequently, the second bender 20 folds, downward, portions 8aa protruding upward from the side surface 10c. The portions 8aa are portions of the outer portions 8a folded upward. The portions 8aa are aligned along the side surface 10c to cause the two portions 8aa to abut against each other (refer to, for example, FIGS. 7 to 12).

Both the first and second benders 19 and 20 have multiple processing rollers appropriately at different positions in the direction in which the materials moves (hereafter, the processing rollers in the first and second benders 19 and 20 may be referred to as processing rollers 19R and 20R).

The first and second benders 19 and 20 bend the elongated material 8 by driving the processing rollers 19R and 20R to rotate.

For smooth bending using the respective processing rollers 19R and 20R, the first and second benders 19 and 20 appropriately support the elongated material 8 with support rollers (not shown).

For example, the first bender 19 performs bending using the processing rollers 19R to place the two portions 8a in the elongated material 8 nearer the side surfaces 10d and 10f downstream in the movement direction. More specifically, the multiple processing rollers 19R are located to cause the bending to place the portions 8a being nearer the side surfaces 10d and 10f in the first, second, and third steps downstream in the movement direction.

Figure 7:
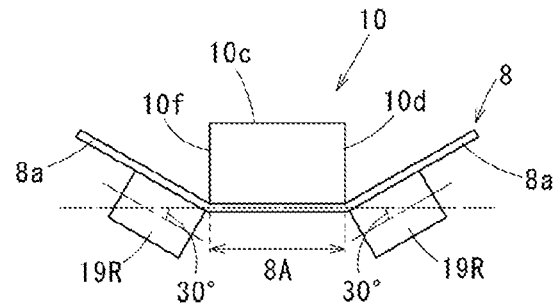
FIG. 7 is a diagram describing processing performed by the hollow-body forming unit at a position P1 (first embodiment).
Figure 8:
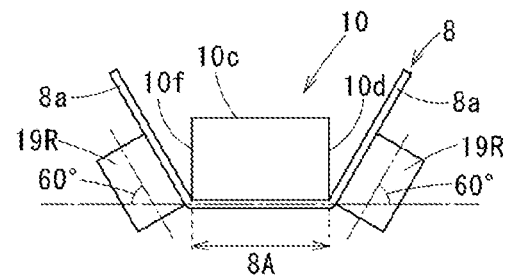
FIG. 8 is a diagram describing processing performed by the hollow-body forming unit at a position P2 (first embodiment).
Figure 9:
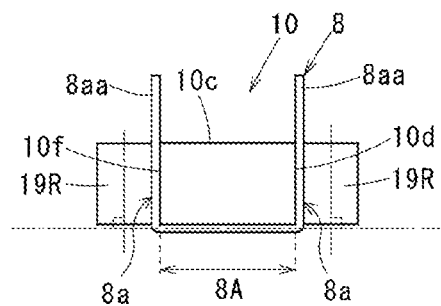
FIG. 9 is a diagram describing processing performed by the hollow-body forming unit at a position P3 (first embodiment).

For example, at a position P1 at which the first bending step is performed, the processing rollers 19R are located below the portions 8a and on the two outer ends of the range 8A, with the rotation axes inclined by 30° with respect to the range 8A (refer to FIG. 7). Subsequently, at a position P2 at which the second bending step is performed, the processing rollers 19R are located below the portions 8a and on the two outer ends of the range 8A, with the rotation axes inclined by 60° with respect to the range 8A (refer to FIG. 8). Subsequently, at a position P3 at which the third bending step is performed, the processing rollers 19R are located on the two outer ends of the range 8A, with the rotation axes perpendicular to the range 8A (refer to FIG. 9).

Subsequently, for example, the second bender 20 performs the bending using the processing rollers 20R to place the two portions 8aa in the elongated material 8 nearer the side surface 10c downstream in the direction in which the materials move. More specifically, the multiple processing rollers 20R are located to cause the bending to place the portions 8aa being nearer the side surface 10c in the fourth, fifth, and sixth steps downstream in the movement direction.

Figure 10:
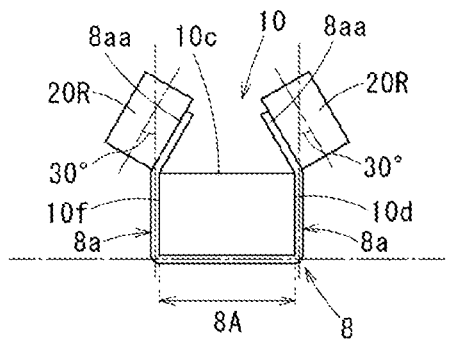
FIG. 10 is a diagram describing processing performed by the hollow-body forming unit at a position P4 (first embodiment).
Figure 11:
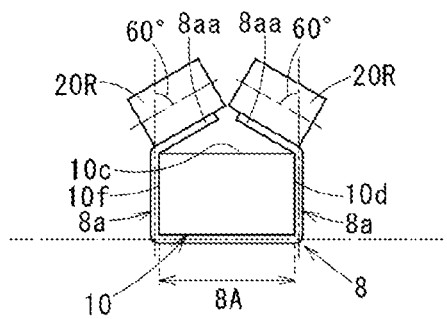
FIG. 11 is a diagram describing processing performed by the hollow-body forming unit at a position P5 (first embodiment).

For example, at a position P4 at which the fourth bending step is performed, the processing rollers 20R are located above the two portions 8a, with the rotation axes inclined by 30° with respect to the ranges of the portions 8a along the side surfaces 10d and 10f (refer to FIG. 10). Subsequently, at a position P5 at which the fifth bending step is performed, the processing rollers 20R are located above the two portions 8a, with the rotation axes inclined by 60° with respect to the ranges of the portions 8a along the side surfaces 10d and 10f (refer to FIG. 11).

Figure 12:
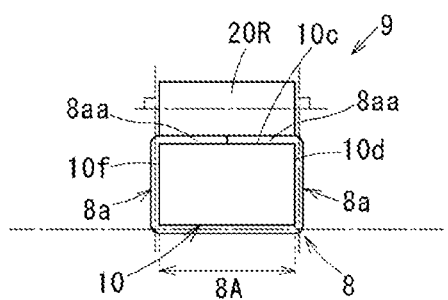
FIG. 12 is a diagram describing processing performed by the hollow-body forming unit at a position P6 (first embodiment).

In addition, at a position P6 at which the sixth bending step is performed, the processing rollers 20R are located, with the rotation axes perpendicular to the ranges of the portions 8a along the side surfaces 10d and 10f (refer to FIG. 12). After the first to sixth bending steps are performed, the ends of the abutting portions 8aa are welded to form the hollow body 9 to enclose the inner periphery of the hollow body 9.

Thus, the hollow body 9 having a rectangular cross section is formed, and the pillar 10 is successively and linearly accommodated at the inner periphery of the hollow body 9.

The degasser 4 performs degassing, in which the degasser 4 heats the sublime substance accommodated at the inner periphery of the hollow body 9 to sublime, and extracts gas caused by sublimation out of the hollow body 9 through pores formed in the hollow body 9. More specifically, the degasser 4 heats the hollow body 9 from outside using a heater (not shown), and forms the pores in the hollow body 9 with laser beams. Thus, the sublime substance sublimes, and gas caused by the sublimation is extracted out of the hollow body 9 through the pores.

A collection container (not shown) that collects the gas caused by the sublimation is located around the degasser 4. The hollow body 9 then passes through the collection container to be fed to the compressor 5. A laser beam irradiator (not shown) is, for example, located in the collection container. The irradiator intermittently operates to irradiate the hollow body 9 with laser beams at predetermined intervals.

The compressor 5 performs compressing, in which the compressor 5 compresses the hollow body 9 accommodating powder from the outer periphery of the hollow body 9 to compact the powder to allow the powder to substantially show its function. More specifically, the compressor 5 compacts the powder left at the inner periphery of the hollow body 9 after the degassing to allow the powder to substantially show its function.

The compressor 5 presses the hollow body 9 from the outer periphery of the hollow body 9 to cause a portion the material for the hollow body 9 to protrude outward.

The compressor 5 is described in detail below.

Figure 13:
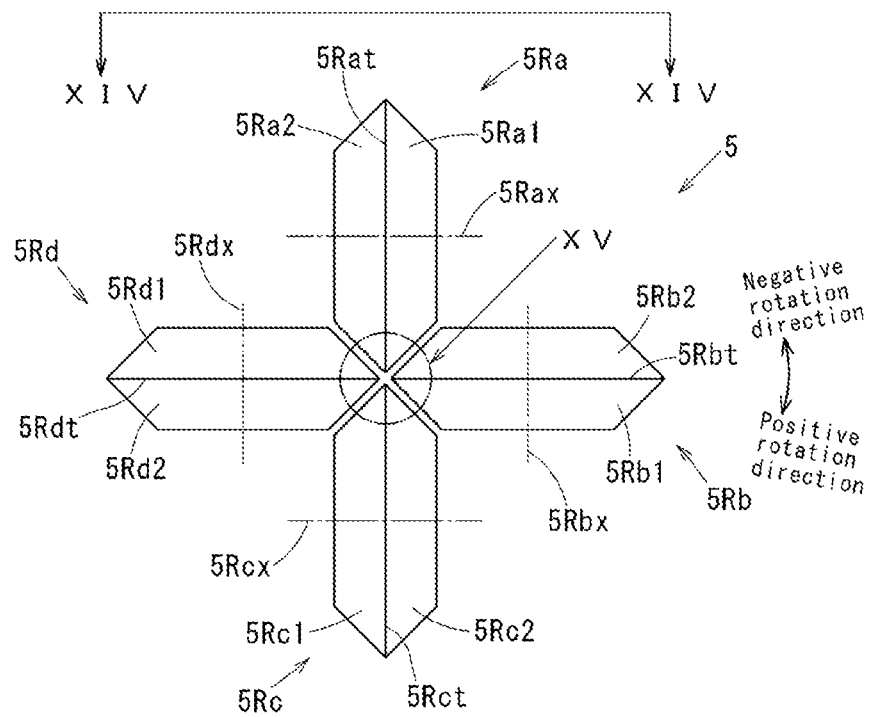
FIG. 13 is a diagram of a compressor (first embodiment).
Figure 14:
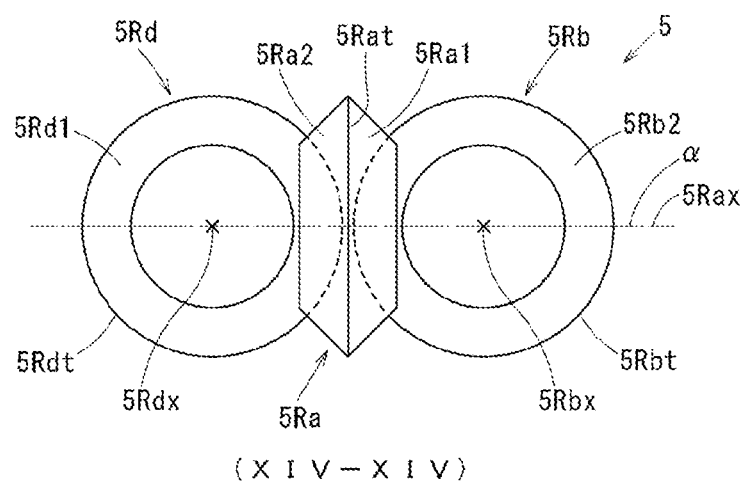
FIG. 14 is a view of the compressor as viewed in the direction indicated by the arrows along line XIV-XIV in FIG. 13 (first embodiment).
Figure 15:
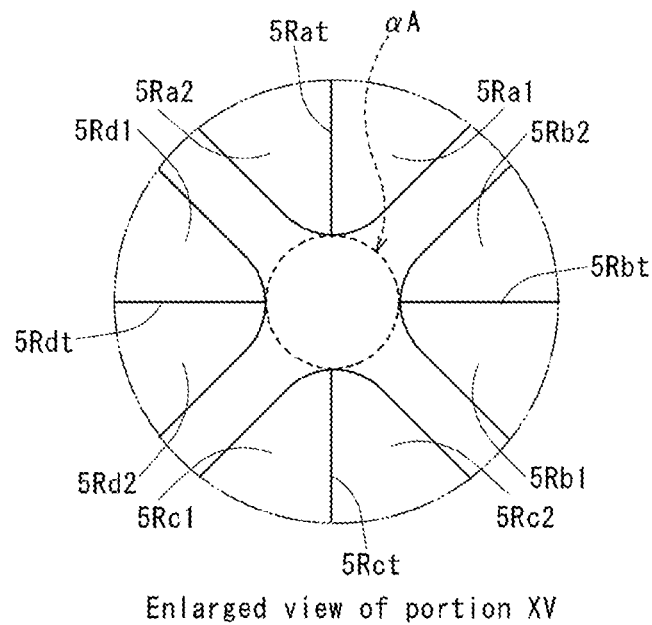
FIG. 15 is an enlarged view of a portion XV in FIG. 13 (first embodiment).
Figure 16:
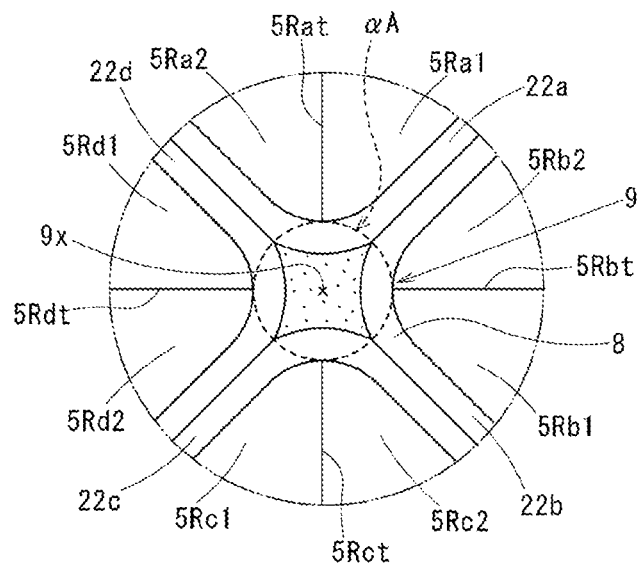
FIG. 16 is a diagram describing processing performed by the compressor (first embodiment).

The compressor 5 includes, for example, four processing rollers 5Ra, 5Rb, 5Rc, and 5Rd having the same shape (refer to, for example, FIGS. 13 and 14).

Each of the processing rollers 5Ra to 5Rd has a peripheral surface with an apex 5Rat, 5Rbt, 5Rct, or 5Rdt, protruding outward, at the center of the corresponding one of the processing rollers 5Ra to 5Rd in the rotation axis direction. In other words, the processing rollers 5Ra to 5Rd each have a truncated bicone shape.

In the example below, the rotation axes of the processing rollers 5Ra, 5Rb, 5Rc, and 5Rd may be referred to as rotation axes 5Rax, 5Rbx, 5Rcx, and 5Rdx.

The processing rollers 5Ra to 5Rd are installed to have the rotation axes 5Rax and 5Rbx, the rotation axes 5Rbx and 5Rcx, the rotation axes 5Rcx and 5Rdx, and the rotation axes 5Rdx and 5Rax perpendicular to each other. A cross section a of the processing rollers 5Ra to 5Rd including the rotation axes 5Rax to 5Rdx (refer to, for example, FIG. 14) includes a hollow area αA roughly defined by the apexes 5Rat to 5Rdt (refer to, for example, FIGS. 15 and 16).

The processing rollers 5Ra to 5Rd are, for example, driven to rotate, with the apexes 5Rat to 5Rdt in the hollow area αA of the cross section a having the same speed vectors directed in the same direction. Thus, the hollow body 9 that has passed through the degasser 4 is drawn into the processing rollers 5Ra to 5Rd, with its longitudinal direction perpendicular to the cross section α and its center axis 9x passing the center of the hollow area αA.

Thus, the cross section of the hollow body 9 is reduced to the hollow area αA in the cross section α. The reduced cross section of the hollow body 9 reduces the capacity at the inner periphery of the hollow body 9 and compacts the powder at the inner periphery of the hollow body 9.

The processing rollers 5Ra, 5Rb, 5Rc, and 5Rd are arranged in this order in a positive rotation direction when rotating around the hollow body 9 as viewed from downstream in the direction in which the hollow body 9 moves. The peripheral surface of the processing roller 5Ra includes a portion adjacent to the apex 5Rat in the positive rotation direction that may be referred to as a peripheral surface 5Ra1, and a portion adjacent to the apex 5Rat in a negative rotation direction that may be referred to as a peripheral surface 5Ra2.

Similarly, the peripheral surface of the processing roller 5Rb includes a portion adjacent to the apex 5Rbt in the positive rotation direction that may be referred to as a peripheral surface 5Rb1, and a portion adjacent to the apex 5Rbt in the negative rotation direction that may be referred to as a peripheral surface 5Rb2. The peripheral surface of the processing roller 5Rc includes a portion adjacent to the apex 5Rct in the positive rotation direction that may be referred to as a peripheral surface 5Rc1, and a portion adjacent to the apex 5Rct in the negative rotation direction that may be referred to as a peripheral surface 5Rc2. The peripheral surface of the processing roller 5Rd includes a portion adjacent to the apex 5Rdt in the positive rotation direction that may be referred to as a peripheral surface 5Rd1, and a portion adjacent to the apex 5Rdt in the negative rotation direction that may be referred to as a peripheral surface 5Rd2.

In the cross section a, the peripheral surfaces 5Ra1 to 5Rd1 face the peripheral surfaces 5Ra2 to 5Rd2, with minimum gaps between the peripheral surfaces 5Ra1 and 5Rb2, between the peripheral surfaces 5Rb1 and 5Rc2, between the peripheral surfaces 5Rc1 and 5Rd2, and between the peripheral surfaces 5Rd1 and 5Ra2.

With the cross section of the hollow body 9 reduced, portions of the material for the hollow body 9 enter the gaps between the peripheral surfaces 5Ra1 and 5Rb2, between the peripheral surfaces 5Rb1 and 5Rc2, between the peripheral surfaces 5Rc1 and 5Rd2, and between the peripheral surfaces 5Rd1 and 5Ra2 to protrude outward from the hollow body 9.

In the example below, portions of the material that protrude outward through the gaps between the peripheral surfaces 5Ra1 and 5Rb2, between the peripheral surfaces 5Rb1 and 5Rc2, between the peripheral surfaces 5Rc1 and 5Rd2, and between the peripheral surfaces 5Rd1 and 5Ra2 may be referred to as protrusions 22a, 22b, 22c, and 22d.

The adder 6 performs an additional process, in which the adder 6 bends the protrusions 22a, 22b, 22c, and 22d to define hollow spaces separate from the inner periphery of the hollow body 9 at the outer periphery of the compressed hollow body 9. Hereafter, the spaces defined by bending the protrusions 22a, 22b, 22c, and 22d may be referred to as spaces 23a, 23b, 23c, and 23d.

The adder 6 appropriately includes, for example, multiple combinations of processing rollers 6Ra, 6Rb, 6Rc, and 6Rd having the same shape and described below, arranged for each step in the direction in which the compressed hollow body 9 moves (refer to, for example, FIGS. 17 to 21). In each step, the processing rollers 6Ra, 6Rb, 6Rc, and 6Rd bend the protrusions 22a, 22b, 22c, and 22d.

In the example below, the rotation axes of the processing rollers 6Ra, 6Rb, 6Rc, and 6Rd may be referred to as rotation axes 6Rax, 6Rbx, 6Rcx, and 6Rdx.

Figure 19:
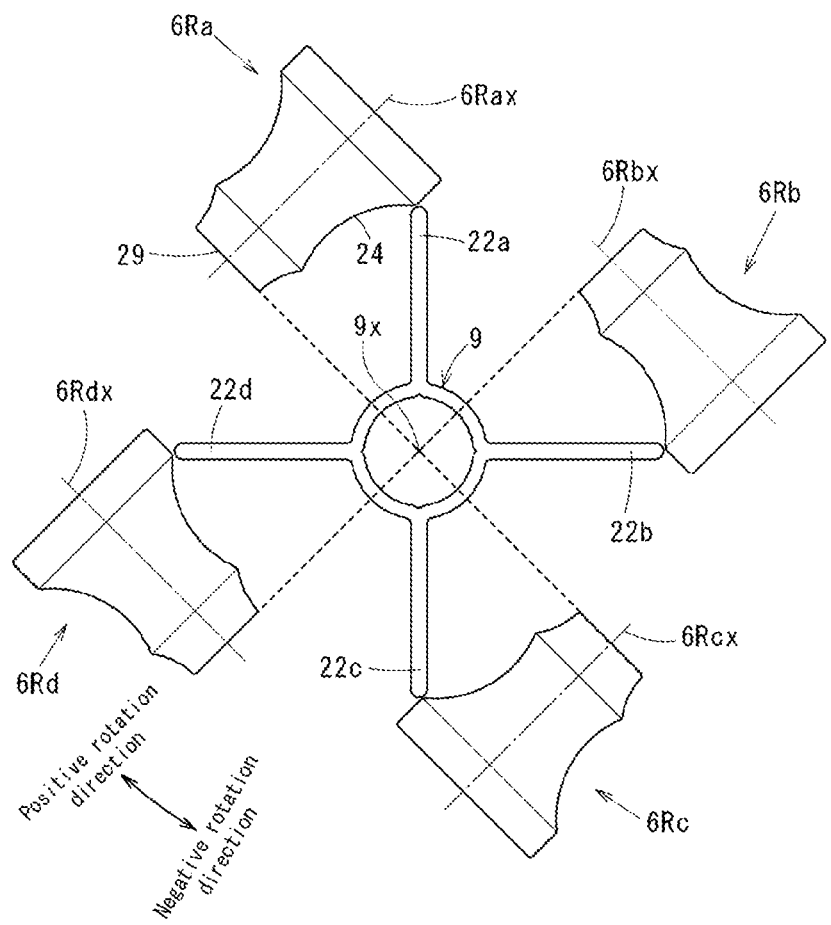
FIG. 19 is a diagram describing the arrangement of the processing rollers in the adder at a position P11 (first embodiment).

In each step, the processing rollers 6Ra to 6Rd are installed to have the rotation axes 6Rax and 6Rbx, the rotation axes 6Rbx and 6Rcx, the rotation axes 6Rcx and 6Rdx, and the rotation axes 6Rdx and 6Rax perpendicular to each other (refer to, for example, FIG. 19). The processing rollers 6Ra, 6Rb, 6Rc, and 6Rd are arranged in this order in the positive rotation direction when rotating around the hollow body 9 as viewed from downstream in the direction in which the hollow body 9 moves.

Figure 20:
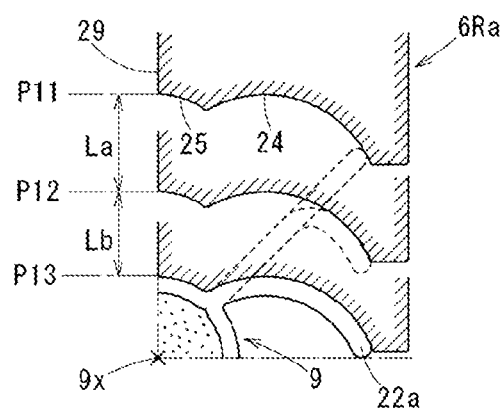
FIG. 20 is a diagram describing a positional change of the processing roller at a third bender in the adder (first embodiment).
Figure 21:
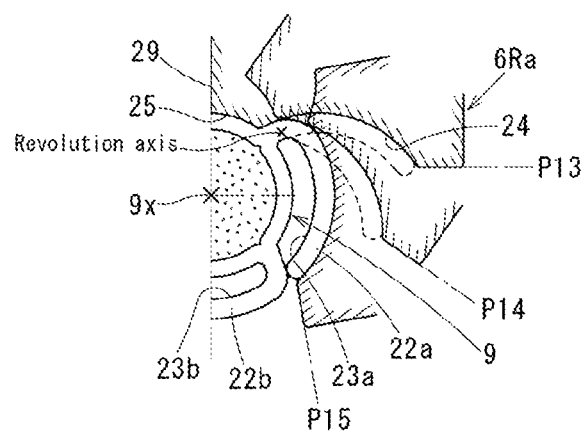
FIG. 21 is a diagram describing a positional change of the processing roller at a fourth bender in the adder (first embodiment).
Figure 22:
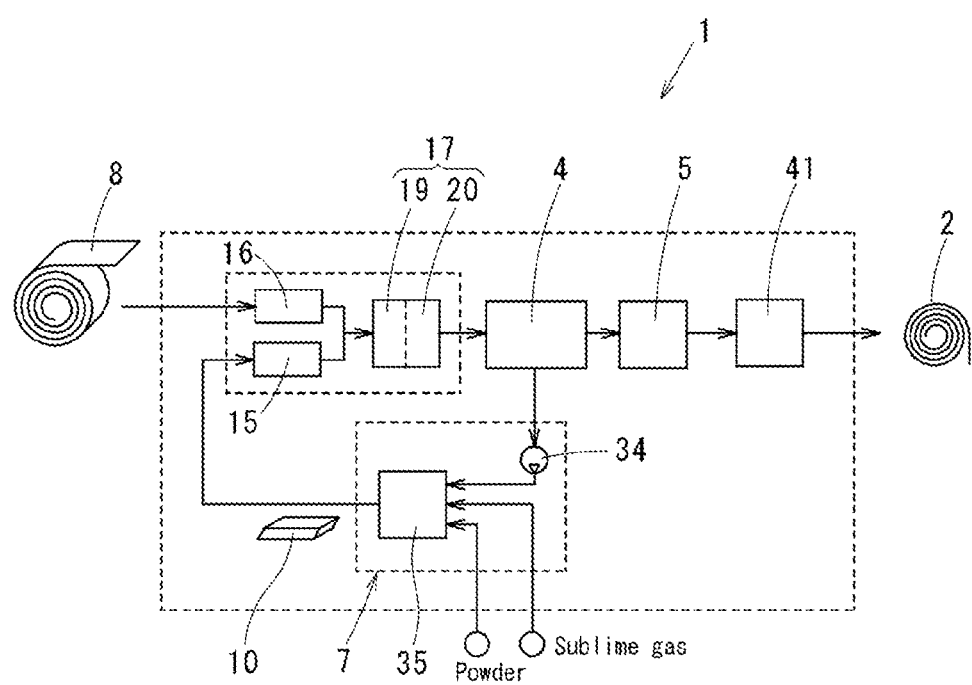
FIG. 22 is a block diagram of a manufacturing device (second embodiment).
Figure 23:
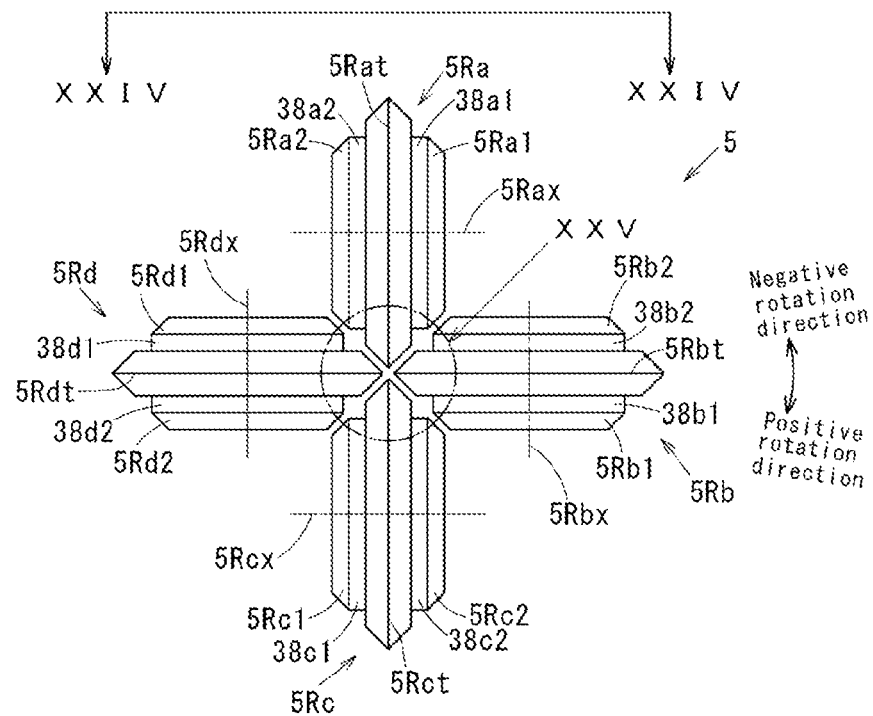
FIG. 23 is a diagram of a compressor (second embodiment).
Figure 24:
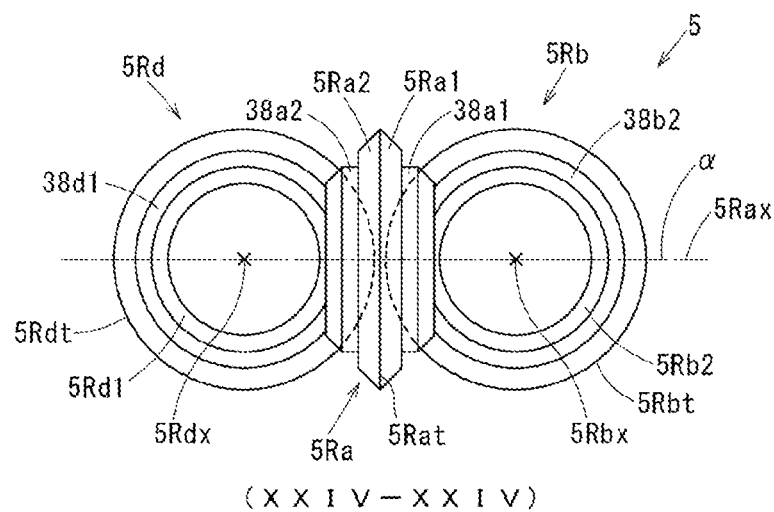
FIG. 24 is a view of the compressor as viewed in the direction indicated by the arrows along line XXIV-XXIV in FIG. 23 (second embodiment).

The adder 6 drives the processing rollers 6Ra to 6Rd in each step to rotate to bend the protrusions 22a to 22d stepwise to define the spaces 23a to 23d (refer to, for example, FIGS. 19 to 21). For smooth bending with the processing rollers 6Ra to 6Rd, the adder 6 also appropriately supports the protrusions 22a to 22d using support rollers (not shown).

Figure 18:
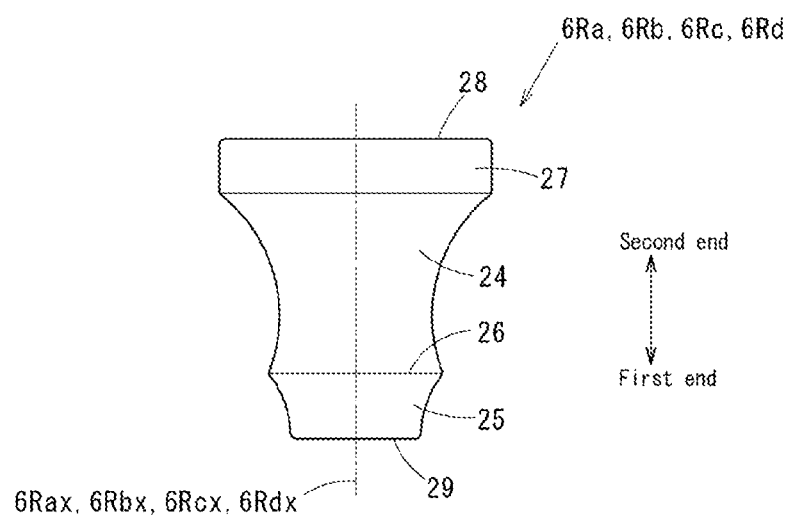
FIG. 18 is a diagram of a processing roller in the adder (first embodiment).

Hereafter, the shape of the processing roller 6Ra is described in detail, and the processing rollers 6Rb to 6Rd also have the same shape as the processing roller 6Ra (refer to, for example, FIG. 18).

The processing roller 6Ra has, on its outer circumferential surface, a processing surface 24 that presses the protrusions 22a to 22d while rotating. The generating line of the processing surface 24 is an arc that recedes toward the rotation axis 6Rax. This shape of the arc is substantially in conformance with the shape of the outer surface of the outer circumferential wall of the space 23a (refer to, for example, FIG. 21).

The outer circumferential surface of the processing roller 6Ra includes the generating line in a first area of the processing surface 24 in the direction of the rotation axis 6Rax. The generating line has an arc shape.

Hereafter, the outer circumferential surface of the processing roller includes the first area of the processing surface 24 that may be referred to as a stop surface 25. In addition, the circumference serving as the boundary between the processing surface 24 and the stop surface 25 may be referred to as a boundary circumference 26.

The outer circumferential surface of the processing roller 6Ra includes, as a cylindrical surface 27, a second area of the processing surface 24 in the direction of the rotation axis 6Rax. The cylindrical surface 27 is smoothly continuous with a second end face 28 of the processing roller 6Ra at its second end, and smoothly continuous with the second end of the processing surface 24 at its first end. The cylindrical surface 27 has a larger diameter than the first area of the processing surface 24 (the stop surface 25). The stop surface 25 is smoothly continuous with a first end face 29 of the processing roller 6Ra at its first end.

Hereafter, the adder 6 is described below in detail.

Figure 17:
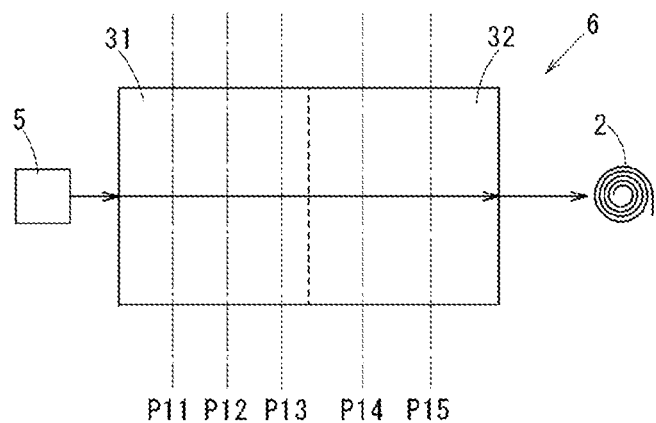
FIG. 17 is a diagram describing an adder (first embodiment).

The adder 6 includes third and fourth benders 31 and 32 (refer to, for example, FIGS. 1 and 17). As described above, each of the third and fourth benders 31 and 32 includes a set of four processing rollers 6Ra to 6Rd. The processing rollers 6Ra to 6Rd are appropriately at different positions in the direction in which the hollow body 9 moves.

The third and fourth benders 31 and 32 are sequentially located downstream in the direction in which the hollow body 9 moves. The third and fourth benders 31 and 32 cause more bending using the processing rollers 6Ra to 6Rd to move the protrusions 22a to 22d toward the hollow body 9 stepwise as the hollow body 9 moves further downstream in the movement direction (refer to, for example, FIGS. 17 and 19 to 21).

In the third bender 31, the processing rollers 6Ra to 6Rd are located to linearly move the processing surfaces 24 toward the hollow body 9 as the hollow body 9 moves further downstream in the movement direction (refer to, for example, FIGS. 17, 19, and 20).

For example, at the position P11 at which the first bending step is performed, the processing rollers 6Ra to 6Rd are located to include the center axis 9x of the hollow body 9 when the first end faces 29 are extended toward the center axis 9x, and second ends of the processing surfaces 24 are in contact with the ends of the protrusions 22a to 22d.

At a position P12 at which the second bending step is performed, the processing rollers 6Ra to 6Rd are located nearer the center axis 9x by a distance La than the processing rollers 6Ra to 6Rd at the position P11, with the first end faces 29 maintaining the similar relationship with the center axis 9x to the processing rollers 6Ra to 6Rd at the position P11 (refer to, for example, FIG. 20). The processing surfaces 24 are in contact with the protrusions 22a to 22d within a predetermined range from the second ends. Portions of the protrusions 22a to 22d in contact with the processing surfaces 24 are folded along the shape of the processing surfaces 24.

At a position P13 at which the third bending step is performed, the processing rollers 6Ra to 6Rd are located nearer the center axis 9x by a distance Lb than the processing rollers 6Ra to 6Rd in the second step, with the first end faces 29 maintaining the similar relationship with the center axis 9x to the processing rollers 6Ra to 6Rd in the first and second steps. The stop surfaces 25 are in contact with the outer peripheral surface of the hollow body 9. The contact of the stop surface 25 forms the outer peripheral surface of the hollow body 9 into a cylinder. The processing surfaces 24 come into contact with the protrusions 22a to 22d throughout the ranges, and the protrusions 22a to 22d are folded along the shape of the processing surfaces 24.

Subsequently, in the fourth bender 32, the processing rollers 6Ra to 6Rd are located to cause the processing surfaces 24 to revolve about revolution axes to move further toward the hollow body 9 as the hollow body 9 moves further downward in the movement direction.

For example, at a position P14 at which a fourth bending step is performed, the processing rollers 6Ra to 6Rd are located to cause the processing surfaces 24 to revolve about revolution axes by, for example, an angle θ1 (not shown) to move further toward the outer periphery of the hollow body 9 than the processing rollers 6Ra to 6Rd at the position P13. The protrusions 22a to 22d revolve by the angle θ1 to move further toward the outer peripheral surface of the hollow body 9 than when being at the position P13.

Subsequently, at a position P15 at which a fifth bending step is performed, the processing rollers 6Ra to 6Rd are located to cause the processing surfaces 24 to revolve about revolution axes by, for example, an angle θ2 (not shown) to move further toward the outer peripheral surface of the hollow body 9 than the processing rollers 6Ra to 6Rd at the position P14. The protrusions 22a to 22d revolve by the angle θ2 further than when being at the position P14, and the ends of the protrusions 22a, 22b, 22c, and 22d are in contact with the protrusions 22b, 22c, 22d, and 22a.

This operation encloses the space between the inner peripheral surface of the protrusion 22a and the outer peripheral surface of the hollow body 9 to define the space 23a. Similarly, this operation encloses the space between the inner peripheral surface of each of the protrusions 22b, 22c, and 22d and the outer peripheral surface of the hollow body 9 to define the corresponding space 23b, 23c, or 23d.

The cooler 7 performs cooling, in which the cooler 7 mixes the gas extracted by the degasser 4 with the powder, and cools and solidifies the gas together with the powder to shape the pillar 10. The cooler 7 includes a suction pump 34 and a freezer 35 described below (refer to, for example, FIG. 1).

The suction pump 34 sucks the sublime gas collected from the collection container in the degasser 4 and feeds the gas to the freezer 35. The freezer 35 cools and solidifies, using a predetermined freezer (not shown), the collected sublime gas and a mixture of the powder and newly fed sublime gas to form the pillar 10.

Effects of First Embodiment

The manufacturing device 1 according to the first embodiment manufactures the linear member 2 having a predetermined function, and includes the compressor 5. More specifically, the compressor 5 compresses, from the outer periphery of the hollow body 9, the elongated hollow body 9 that accommodates powder of a substance having the predetermined function at its inner periphery to compact the powder to allow the powder to substantially show its function.

Thus, the linear member 2 can accommodate the powder of the substance having the predetermined function to allow the powder of the substance to extend in the longitudinal direction while being compacted at the inner periphery of the hollow body 9. Thus, the linear member 2 can be freely deformed while linearly accommodating the powder and maintaining the powder compacted. This structure can reduce changes in the physical properties of a substance in the linear member 2 having the predetermined function that may be caused when the substance is formed into a linear shape from the powder.

The manufacturing device 1 further includes the forming unit 3. More specifically, the forming unit 3 places, on the plate-like elongated material 8 with a predetermined thickness, the powder linearly in the longitudinal direction of the elongated material 8 and folds the elongated material 8 to wrap the powder to form the hollow body 9.

Thus, the powder can be accommodated at the inner periphery of the hollow body 9.

The powder accommodated at the inner periphery of the hollow body 9 is bound with a sublime substance. The manufacturing device 1 further includes the degasser 4. More specifically, the degasser 4 heats the sublime substance accommodated at the inner periphery of the hollow body 9 to sublime to extract gas caused by sublimation out of the hollow body 9 through a pore formed in the hollow body 9.

The powder bound with the sublime substance can be easily placed on the elongated material 8. The sublime substance left unused after the powder is accommodated at the inner periphery of the hollow body 9 can be easily removed from the inner periphery of the hollow body 9.

The forming unit 3 places the powder on the elongated material 8 in the shape of the pillar 10 formed together with the sublime substance to have the pillar 10 accommodated at the inner periphery of the hollow body 9.

Thus, the powder can be more easily placed on the elongated material 8.

The pillar 10 has two end faces in the longitudinal direction of the pillar 10 inclined with respect to the longitudinal direction.

When the powder is formed into the pillar 10 together with the sublime substance, the mass fraction of the powder is usually higher at or around the surface of the pillar 10 than inside the pillar 10. Thus, the surfaces of the pillar 10 at the two ends in the longitudinal direction are inclined with respect to the longitudinal direction to elongate a joint between the pillars 10 on the elongated material 8 in the longitudinal direction.

This structure can reduce the likelihood that the mass fraction of the powder increases at the joint between the pillars 10.

The manufacturing device 1 also includes the cooler 7. More specifically, the cooler 7 mixes the gas extracted by the degasser 4 with the powder and cools and solidifies the gas together with the powder to shape the pillar 10.

Thus, the manufacturing device 1 can reuse the sublime substance.

The compressor 5 compresses the hollow body 9 to cause a portion of the material for the hollow body 9 to protrude outward. The manufacturing device 1 includes the adder 6. More specifically, the adder 6 bends the protrusions 22a to 22d protruding outward with the compressor 5 to define the spaces 23a to 23d separate from the inner periphery of the hollow body 9 at the outer periphery of the hollow body 9.

This structure allows another substance to be filled into or to circulate through the spaces 23a to 23d. When, for example, the linear member 2 is used as an electric cable, the electric cable can be cooled with a refrigerant circulating through the spaces.

Second Embodiment

A manufacturing method according to a second embodiment is described with reference to FIGS. 22 to 31.

In compression with the manufacturing method according to the second embodiment, the hollow body 9 is compressed to cause a portion of the material for the hollow body 9 to protrude outward. In addition, the protrusion protruding outward from the hollow body 9 forms another hollow body 9 accommodating the powder that is also compacted.

The compressor 5 in the second embodiment has the following structure to perform such compression (refer to, for example, FIGS. 23 to 26).

More specifically, the compressor 5 in the second embodiment includes four processing rollers 5Ra, 5Rb, 5Rc, and 5Rd having the same shape, and different from the processing rollers 5Ra, 5Rb, 5Rc, and 5Rd in the first embodiment.

Peripheral surfaces 5Ra1, 5Rb1, 5Rc1, and 5Rd1 of the processing rollers 5Ra, 5Rb, 5Rc, and 5Rd in the second embodiment include annular steps 38a1, 38b1, 38c1, and 38d1. Similarly, peripheral surfaces 5Ra2, 5Rb2, 5Rc2, and 5Rd2 also include annular steps 38a2, 38b2, 38c2, and 38d2 (refer to, for example, FIG. 23).

Figure 25:
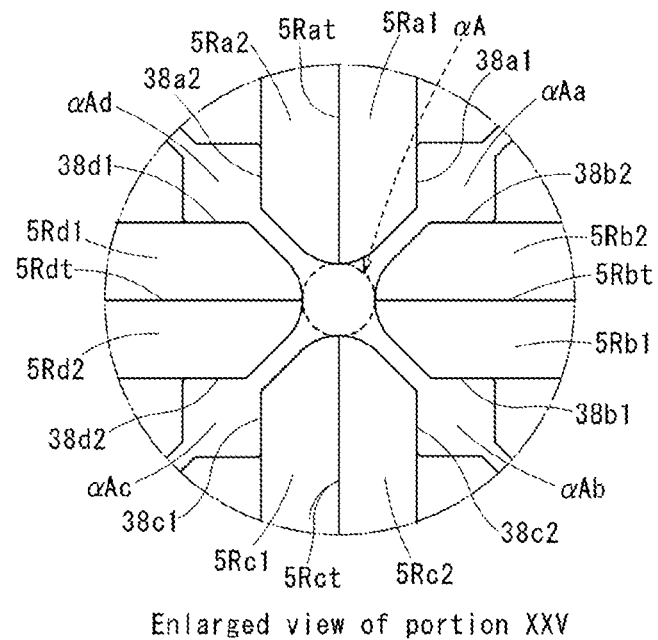
FIG. 25 is an enlarged view of a portion XXV in FIG. 23 (second embodiment).
Figure 26:
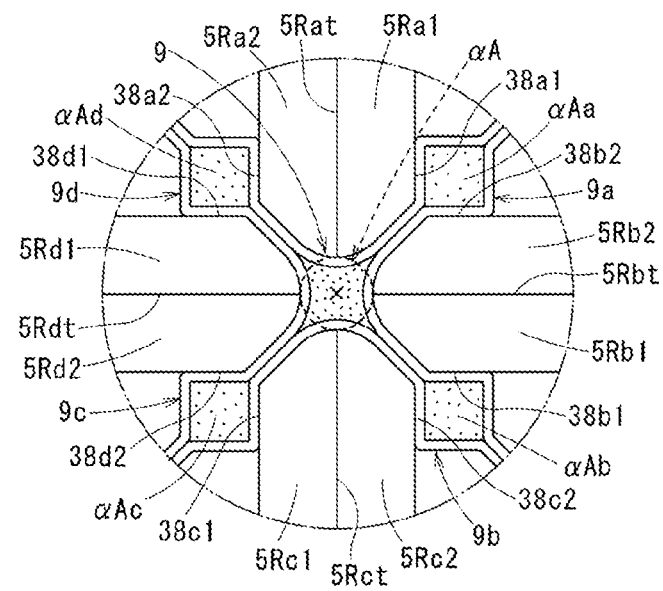
FIG. 26 is a diagram describing processing performed by the compressor (second embodiment).
Figure 27:
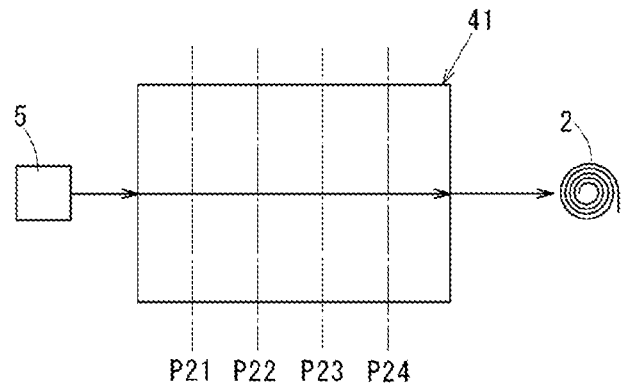
FIG. 27 is a diagram describing a twister (second embodiment).

In the cross section a, the steps 38a1 and 38b2 face each other in the circumferential direction around the hollow area αA (refer to, for example, FIG. 25). Thus, the gap between the peripheral surfaces 5Ra1 and 5Rb2 is partially enlarged to form another hollow area αAa. In the cross section α, the steps 38b1 and 38c2, the steps 38c1 and 38d2, and the steps 38d1 and 38a2 are similarly located to partially enlarge the gaps between the peripheral surfaces 5Rb1 and 5Rc2, between the peripheral surfaces 5Rc1 and 5Rd2, and between the peripheral surfaces 5Rd1 and 5Ra2 to form other hollow areas αAb, αAc, and αAd.

Thus, in the cross section a, the hollow areas αAa, αAb, αAc, and αAd are formed around the hollow area αA at 90° angular intervals, and at the same positions in the radial direction.

In the second embodiment, the shapes of the steps 38a1 to 38d1 and 38a2 to 38d2 or other characteristics are set to allow the hollow areas αA and αAa to αAd to have the same shape or area.

As in the first embodiment, the compressor 5 drives the processing rollers 5Ra, 5Rb, 5Rc, and 5Rd to rotate and successively feeds the hollow body 9.

Thus, the cross section of the hollow body 9 is reduced to the hollow area αA, and a portion of the material for the hollow body 9 protrudes outward.

Portions of the protrusions 22a to 22d in the first embodiment within the hollow areas αA and αAa to αAd include other hollow bodies 9 accommodating powder. The powder is also introduced into and compacted in these hollow bodies 9. Thus, five solid wires can be manufactured at a time (refer to, for example, FIG. 26).

Hereafter, the hollow bodies 9 in the hollow areas αAa, αAb, αAc, and αAd may be referred to as hollow bodies 9a, 9b, 9c, and 9d.

The manufacturing method according to the second embodiment includes twisting described below instead of the additional process in the first embodiment. The manufacturing device 1 includes a twister 41 that performs twisting in place of the adder 6 (refer to, for example, FIGS. 22 and 27). The hollow bodies 9 and 9a to 9d formed by the compressor 5 are fed to the twister 41 while maintaining their arrangement. Hereafter, the twister 41 is described in detail.

The twister 41 performs twisting, in which the twister 41 twists the five hollow bodies 9 and 9a to 9d formed in the compression.

The twister 41 includes multiple sets of four processing rollers 41Ra to 41Rd including steps 38a1 to 38d1 and 38a2 to 38d2 as in the processing rollers 5Ra to 5Rd in the second embodiment. These sets are appropriately at different positions in the movement direction (refer to, for example, FIGS. 27 to 31).

In the example below, the apexes of the processing rollers 41Ra to 41Rd may be referred to as apexes 41Rat, 41Rbt, 41Rct, and 41Rdt. The rotation axes of the processing rollers 41Ra, 41Rb, 41Rc, and 41Rd may be referred to as rotation axes 41Rax, 41Rbx, 41Rcx, and 41Rdx.

Figure 28:
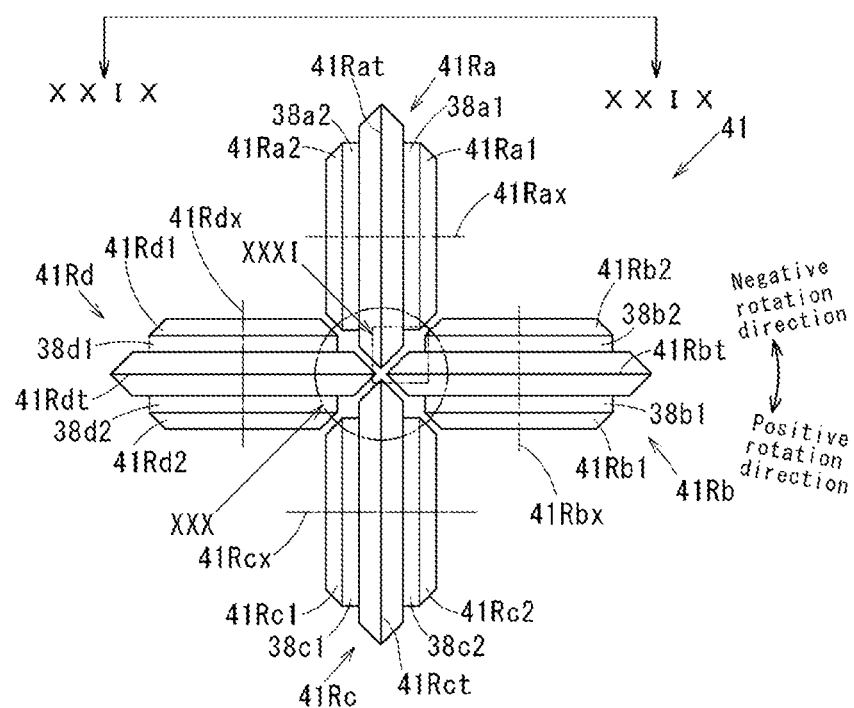
FIG. 28 is a diagram of the twister (second embodiment).
Figure 29:
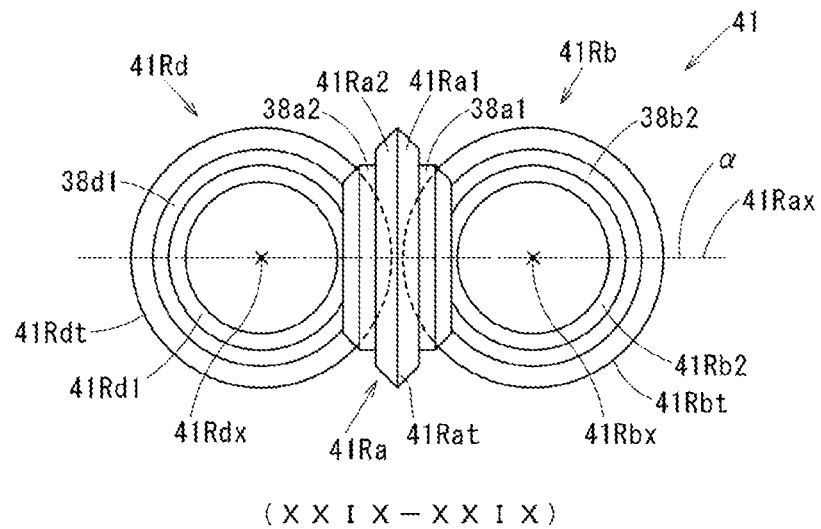
FIG. 29 is a view of the twister as viewed in the direction indicated by the arrows along line XXIX-XXIX in FIG. 28 (second embodiment).
Figure 30:
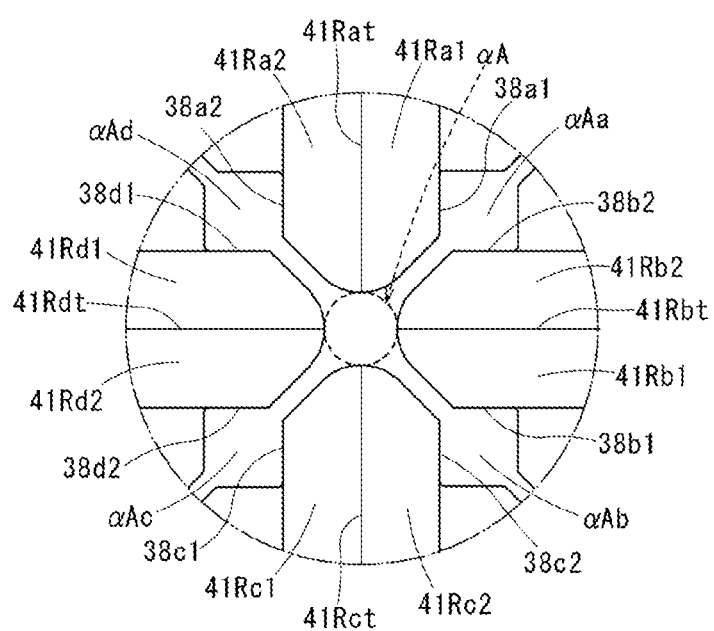
FIG. 30 is an enlarged view of a portion XXX in FIG. 28 (second embodiment).

The processing rollers 41Ra to 41Rd are installed to have the rotation axes 41Rax and 41Rbx, the rotation axes 41Rbx and 41Rcx, the rotation axes 41Rcx and 41Rdx, and the rotation axes 41Rdx and 41Rax perpendicular to each other (refer to, for example, FIG. 28). The processing rollers 41Ra, 41Rb, 41Rc, and 41Rd are arranged in this order in the positive rotation direction when rotating around the hollow body 9 as viewed from downstream in the direction in which the hollow body 9 and other hollow bodies move.

In the example below, the peripheral surface of the processing roller 41Ra includes a portion adjacent to the apex 41Rat in the positive rotation direction that may be referred to as a peripheral surface 41Ra1, and a portion adjacent to the apex 41Rat in the negative rotation direction that may be referred to as a peripheral surface 41Ra2.

Similarly, the peripheral surface of the processing roller 41Rb includes a portion adjacent to the apex 41Rbt in the positive rotation direction that may be referred to as a peripheral surface 41Rb1, and a portion adjacent to the apex 41Rbt in the negative rotation direction that may be referred to as a peripheral surface 41Rb2. The peripheral surface of the processing roller 41Rc includes a portion adjacent to the apex 41Rct in the positive rotation direction that may be referred to as a peripheral surface 41Rc1, and a portion adjacent to the apex 41Rct in the negative rotation direction that may be referred to as a peripheral surface 41Rc2. The peripheral surface of the processing roller 41Rd includes a portion adjacent to the apex 41Rdt in the positive rotation direction that may be referred to as a peripheral surface 41Rd1, and a portion adjacent to the apex 41Rdt in the negative rotation direction that may be referred to as a peripheral surface 41Rd2.

The steps 38a1, 38b1, 38c1, and 38d1 are located on the peripheral surfaces 41Ra1, 41Rb1, 41Rc1, and 41Rd1. The steps 38a2, 38b2, 38c2, and 38d2 are located on the peripheral surfaces 41Ra2, 41Rb2, 41Rc2, and 41Rd2.

The hollow area αA similar to that in the compressor 5 is roughly defined by the apexes 41Rat to 41Rdt. Hollow areas αAa, αAb, αAc, and αAd are defined around the hollow area αA at 90° angular intervals and at the same positions in the radial direction (refer to, for example, FIG. 30).

Hereafter, the twister 41 is described further in detail.

The twister 41 causes more twisting using the processing rollers 41Ra to 41Rd as the hollow body 9 moves further downstream in the movement direction to place the hollow bodies 9a to 9d toward the hollow body 9 stepwise while rotating about the hollow body 9.

Figure 31:
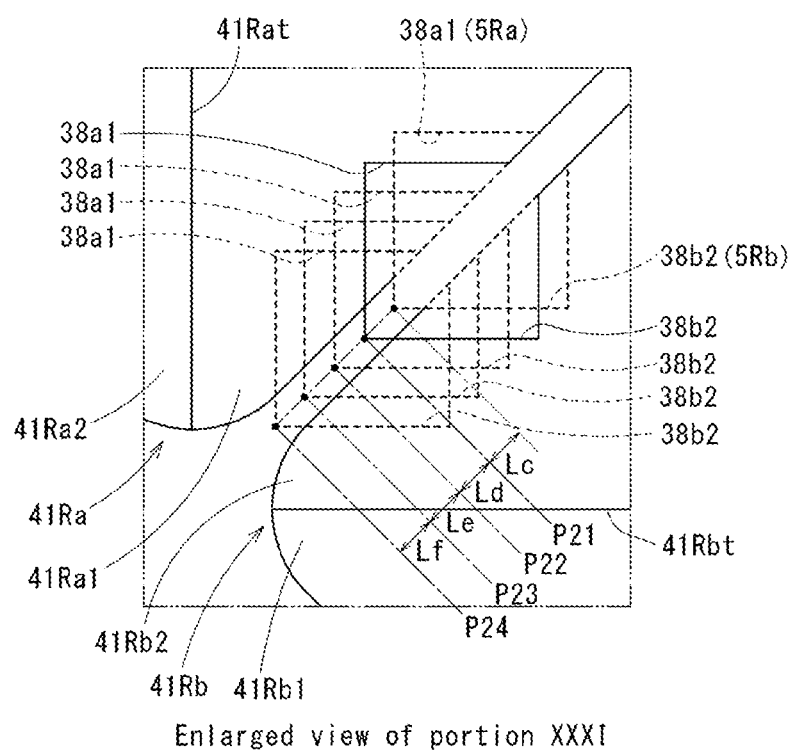
FIG. 31 is an enlarged view of a portion XXXI in FIG. 28 (second embodiment).

For example, at a position P21 in the first step, the hollow areas αAa to αAd of the processing rollers 41Ra to 41Rd are located nearer the hollow area αA by the distance Lc in the radial direction than the processing rollers 5Ra to 5Rd in the compressor 5 (refer to, for example, FIG. 31).

At a position P22 in the second step, the hollow areas αAa to αAd are located nearer the hollow area αA in the radial direction by a distance Ld than the hollow areas αAa to αAd at the position P21 (refer to, for example, FIG. 31). At a position P23 in the third step, the hollow areas αAa to αAd are located nearer the hollow area αA in the radial direction by a distance Le than the hollow areas αAa to αAd at the position P22 (refer to, for example, FIG. 31). At a position P24 in the fourth step, the hollow areas αAa to αAd are located nearer the hollow area αA in the radial direction by a distance Lf than the hollow areas αAa to αAd at the position P23 (refer to, for example, FIG. 31).

The hollow bodies 9 and 9a to 9d fed by the compressor 5 are fed to the processing rollers 41Ra to 41Rd at the positions P21 to P24 as below.

More specifically, at the position P21, the hollow body 9 first passes through the hollow area αA, and the hollow bodies 9a, 9b, 9c, and 9d pass through the hollow areas αAb, αAc, αAd, and αAa. Thus, the hollow bodies 9a to 9d radially approach the hollow body 9 by the distance Lc than the outlet in the compressor 5 while rotating by 90° forward about the hollow body 9.

At the position P22, the hollow body 9 passes through the hollow area αA, and the hollow bodies 9a, 9b, 9c, and 9d pass through the hollow areas αAc, αAd, αAa, and αAb. Thus, the hollow bodies 9a to 9d radially approach the hollow body 9 by the distance Ld while rotating by 90° further forward about the hollow body 9 than at the position P21.

At the position P23, the hollow body 9 passes through the hollow area αA, and the hollow bodies 9a, 9b, 9c, and 9d pass through the hollow areas αAd, αAa, αAb, and αAc. Thus, the hollow bodies 9a to 9d radially approach the hollow body 9 by the distance Le while rotating by 90° further forward about the hollow body 9 than at the position P22.

At the position P24, the hollow body 9 passes through the hollow area αA, and the hollow bodies 9a, 9b, 9c, and 9d pass through the hollow areas αAa, αAb, αAc, and αAd. Thus, the hollow bodies 9a to 9d radially approach the hollow body 9 by the distance Lf while rotating by 90° further forward about the hollow body 9 than at the position P23.

The twister 41 drives the processing rollers 41Ra to 41Rd to rotate at each step to rotate the hollow bodies 9a to 9d about the hollow body 9, and to place the hollow bodies 9a to 9d into tight contact with each other. Thus, the twister 41 can twist the hollow bodies 9 and 9a to 9d together.

The twister 41 twists the hollow bodies 9a to 9d together by rotating the hollow bodies 9a to 9d about the hollow body 9. Thus, the hollow bodies 9a to 9d substantially increase the lengths and reduce the diameters as they pass through the twister 41. Thus, the inner peripheries of the hollow bodies 9a to 9d further reduce the diameters, and the powder is further compacted at the inner peripheries of the hollow bodies 9a to 9d.

To smoothly twist the hollow bodies with the processing rollers 41Ra to 41Rd in each step, the twister 41 appropriately supports the hollow bodies 9 and 9a to 9d using a support roller (not shown).

Modifications

The present invention may be embodied in various modifications without departing from the gist of the invention.

For example, the manufacturing device 1 according to each of the first and second embodiments includes the compressor 5 including sets of four processing rollers 5Ra to 5Rd. In some embodiments, the manufacturing device 1 may include a compressor 5 including sets of three or five or more processing rollers.

In the manufacturing device 1 according to each of the first and second embodiments, the forming unit 3 places, on the elongated material 8, the powder formed into the pillar 10 together with the sublime substance. In some embodiments, the forming unit 3 may place the powder directly on the elongated material 8.

In the manufacturing device 1 according to the second embodiment, the twister 41 places the hollow bodies 9a to 9d into tight contact with one another while rotating the hollow bodies 9a to 9d about the hollow body 9. In some embodiments, the twister 41 may twist the hollow bodies 9 and 9a to 9d together by guiding the hollow bodies 9 and 9a to 9d to have their cross sections aligned on the same circumference.

REFERENCE SIGNS LIST 1 manufacturing device
5 compressor
9 hollow body

The invention claimed is:

1. A method for manufacturing a linear member having a predetermined function, the method comprising:
  placing, on a plate-like elongated material with a predetermined thickness, powder of a substance having a predetermined function linearly in a longitudinal direction of the plate-like elongated material, the powder being bound with a sublime substance in a shape of a pillar formed together with the sublime substance:
  folding the plate-like elongated material to wrap the pillar to form a hollow body to be elongated, the hollow body accommodating the pillar;

heating the sublime substance accommodated at the inner periphery of the hollow body to sublime to extract gas caused by sublimation out of the hollow body through a pore formed in the hollow body; and compressing, from the outer periphery of the hollow body to compact the powder while maintaining the powder linearly accommodated at the inner periphery of the hollow body to extend in a longitudinal direction of the hollow body.

2. The method according to claim 1, wherein
the pillar has two end faces in a longitudinal direction of the pillar inclined with respect to the longitudinal direction.

3. The method according to claim 1, further comprising:
mixing the extracted gas with the powder and cooling and solidifying the gas together with the powder to shape the pillar.

4. The method according to claim 1, wherein
the hollow body accommodates carbon nanotube powder at the inner periphery of the hollow body.

5. The method according to claim 1, wherein
the hollow body accommodates at least one of quartz glass powder or silicon compound powder at the inner periphery of the hollow body.

* * * * *